United States Patent Office 3,746,542
Patented July 17, 1973

3,746,542
PROCESS FOR THE PRODUCTION OF POLYMER IMAGES
Yoshihide Hayakawa and Masato Satomura, Kanagawa, Japan, assignors to Fuji Photo Film Co., Ltd., Minami Ashigara-shi, Kanagawa, Japan
No Drawing. Filed Dec. 9, 1969, Ser. No. 883,597
Claims priority, application Japan, Dec. 10, 1968, 43/90,350
Int. Cl. G03c 1/70
U.S. Cl. 96—48 R                    29 Claims

ABSTRACT OF THE DISCLOSURE

Process for selectively forming polymer images at the latent image-bearing areas of a silver halide photographic emulsion which comprises developing said emulsion in the presence of an addition-polymerizable monomer and any of various hydrazines, hydrazones or hydrazides.

BACKGROUND OF THE INVENTION

(1) Field of the invention

The present invention relates to a process for forming polymer images and more particularly to a process for selectively forming a high molecular weight compound at areas bearing a photographic latent image by the action of a silver halide photographic emulsion and a reducing agent in the presence of addition-polymerizable compound.

(2) Description of the prior art

There have been proposed various methods of forming images with high molecular weight compounds by the photopolymerization of vinyl compounds. It has been proposed, for instance, to cause photopolymerization directly using a silver halide as a catalyst (British Pat. No. 866,631 and S. Levinos et al.; "Photographic Science & Engineering"; vol. 6, pages 222–226 (1962)). It is considered that, in this reaction, the product formed by the photodecomposition of silver halide serves directly as the polymerization catalyst. However, the sensitivity of the reaction is not as high as in the case of reducing silver halide particles by an ordinary development.

It has also been proposed to form imagewise a high molecular weight compound by the polymerization of a vinyl compound using as catalyst a silver image of unreacted silve halide after developing an exposed silver halide emulsion layer in an ordinary developer (Belgian Pat. No. 642,477). This reaction, however, has the disadvantage that development and polymerization must be conducted separately.

It is theoretically of great interest to effect the polymerization of vinyl compounds by the oxidation product or an intermediate product thereof formed by developing an exposed silver halide emulsion layer with a reducing agent in the presence of vinyl compounds, since it can be expected that, in this reaction, the polymerization is effected by both the amplification effect of development and that of chain polymerization. It has already been proposed to effect such a reaction, using as the reducing agent a benzenoid compound having at least two hydroxyl, amino or alkyl- or aryl-substituted amino groups in the ortho- or para-positions to each other on the benzene ring (U.S. Pat. No. 3,019,104 and G. Oster; "Nature"; vol. 180, 1275 (1957)).

SUMMARY OF THE INVENTION

An object of the present invention is to convert a latent image on a photographic silver halide emulsion layer provided by electromagnetic waves or particle rays into an image of a high molecular weight compound.

Another object of the present invention is to obtain a polymer image having desired properties by utilizing this procedure in recording or printing.

The inventors have found that the polymerization of a vinyl compound can be effected by reducing a silver halide, in the presence of the vinyl compound, with a hydrazine or a hydrazine derivative as will be more fully set forth below. It has also been found that when the silver halide is in the form of a silver halide emulsion, the reaction proceeds at a higher rate when the silver halide particles contain development centers than when the particles have no development centers. Hence, by suitably selecting the reaction conditions and time, the polymerization can be carried out selectively at only those areas of a silver halide photographic emulsion layer where the silver halide particles contain centers of development.

DETAILED DESCRIPTION OF THE INVENTION

The objects of the present invention are attained by utilizing the aforesaid fact, that is, by subjecting a silver halide photographic emulsion layer having a photographic latent image to the action of at least one of a hydrazine, a hydrazide and a hydrazone in the presence of a polymerizable vinyl compound, whereby the vinyl compound is polymerized selectively at those areas bearing the latent image.

By "photographic latent image" is meant an invisible imagelike change formed on a silver halide photographic emulsion layer by the action of electromagnetic waves or particle rays, said invisible image-like image being capable of being converted to a visible image by development. In a silver halide photographic emulsion layer forming an ordinary negative image, the latent image results from the formation of development centers on silver halide particles in the silver halide emulsion layer by irradiation with electromagnetic waves or particle rays, while in a silver halide photographic emulsion layer for providing a direct positive image, the latent image is formed by destroying the development centers which already exist on all of the silver halide particles from the first, by irradiation with particle rays or magnetic waves (James & Huggins; "Fundamentals of Photographic Theory"; 2nd edition, Chapters 3 and 4, published by Morgam & Morgam Co. (1960)).

As the silver halide emulsions of the present invention, either of the above types of silver halide emulsions may be employed.

As the silver halide emulsion of the type forming a negative image, a silver halide photographic emulsion to be processed by an ordinary development procedure is employed in the present invention. That is, there may be employed silver chloride, silver bromide, silver chlorobromide, silver iodobromide, silver chloroiodo-bromide photographic emulsions, and the like. The silver halide photographic emulsion used in the present invention may, in addition, be subjected to chemical and/or optical sensitization as usually applied to ordinary photographic emulsions. For chemical sensitization, sulfur or noble metal sensitizations are each applicable (cf.; P. Glafkides; "Chimie Photographique"; 2nd edition, Photocinema, Paul Montel, Paris, 1957, pp. 247–301). For optical sensitization, optical sensitizers as employed in ordinary photographic emulsions, such as cyan dyes and merocyanine dyes may be effectively used (cf.; for example, Kikuchi et al.; "Kagaku Shashin Binran (Handbook of Scientific Photography)"; vol. II, Maruzen Co., 1959, pp. 15–24). Furthermore, the silver halide photographic emulsion may contain stabilizers conventionally used in ordinary photographic techniques.

The direct positive silver halide emulsion which can be used in the present invention may be prepared by solarization, a Herschel effect, a Clayden effect or a Sabatier effect. These effects are described in chapters 6 and 7, by C. E. K. Mees; of "The Theory of the Photographic Process"; 2nd edition, published by McMillan Co., 1954. For preparing the direct positive silver halide emulsion by solarization, a silver halide emulsion susceptible to solarization is prepared and then subjected to a uniform overall exposure to light or the action of a chemical to render it developable without imagewise exposure. The methods of preparing such silver halide emulsions are disclosed in the specifications of British Pat. Nos. 443,245 and 462,730.

The Herschel effect is produced by exposing, to a light of longer wave length, a photographic emulsion which has been rendered developable by uniform overall exposure or uniform action of a chemical reagent. In this case, it is preferable to employ a silver halide emulsion containing silver halide for the most part and to employ a desensitizer such as pynakryptol yellow or phenosafranine to enhance the Herschel effect. Methods of preparing direct positive silver halide emulsions utilizing the Herschel effect are disclosed in the specifications of, for instance, British Pat. No. 667,206 and U.S. Pat. No. 2,857,273.

In order to obtain directly a positive image by utilizing the Clayden effect, it is necessary to subject a silver halide emulsion layer to overall exposure to light of a relatively low intensity after image-wise exposure to light of high intensity for a short period of time, and the areas of the emulsion layer which have not been exposed to the irradation of the high intensity light become developable after the overall exposure.

The Sabatier effect is produced by exposing to a uniform action of light or a chemical reagent, while immersed in a developer, a silver halide photographic emulsion layer which has been subjected to an image-wise exposure to light, whereby the areas which have not been subjected to the image-wise exposure are rendered developable.

The Clayden effect and the Sabatier effect are easily and practically obtained in silver halide emulsions having a tendency of yielding centers of development, by a first exposure in the inner portion rather than in the surface portion of the silver halide particles. The methods of preparing emulsions that have such a tendency of forming internal development centers are disclosed in the specifications of, for instance, U.S. Pat. No. 2,592,250; U.S. Pat. No. 2,497,876; British Pat. No. 1,011,062; and German Pat. No. 1,207,791.

Photographic emulsions as mentioned above consist of a dispersion system, in which silver halide particles are dispersed in a solution of a high molecular weight material. As the high molecular weight material for this purpose, gelatin is widely used. A synthetic high molecular weight polymer, such as polyvinyl alcohol, polyvinyl pyrrolidone, or polyacrylamide as well as a derivative of a natural high polymer, such as carboxymethyl cellulose, cellulose oxyethyl ether or dextran, may also be employed, either alone or in admixture with gelatin (cf.; F. Evva; "Zeitschrift für Wissenschaftliche Photoghaphis, Photophysik und Photochemie"; vol. 52; pages 1–24 (1957)).

As examples of hydrazines and derivatives thereof which may be employed in the present invention are as follows:

General formula (I)

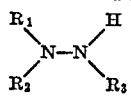

wherein $R_1$ represents a hydrogen atom, a sulfone group, a water-soluble metal or ammonium salt of the sulfone group, an alkyl group, a substituted alkyl group, an aryl group, a substituted aryl group, an acyl group, a substituted acyl group, an arylhydrazinocarbonyl group, a thiocarbamoyl group, an arylazothiocarbonyl group, an arylsulfonyl group, or a substituted arylsulfonyl group; $R_2$ represents a hydrogen atom, an alkyl group, a substituted alkyl group, or an aryl group, and wherein said $R_1$ and $R_2$ may, in addition, form a ring comprising carbon atoms, oxygen atoms, nitrogen atoms, or the like; and $R_3$ represents a sulfone group, a water-soluble metal or ammonium salt of the sulfone group, an aryl group, or a substituted acyl group, and wherein $R_1$ and $R_3$ may also together form a ring structure.

As the substituted alkyl groups, there may be mentioned alkyl groups substituted with halide, carboxyl, sulfonyl, hydroxyl, amino, alkylamino, acylamino or arylamino groups, as well as alkyl groups having functional groups such as ether, carbonyl or ester groups. The substituted acyl groups of this invention are likewise acyl groups substituted as set forth above in regard to the alkyl group substituents.

As substituted aryl groups and arylsulfonyl groups, there may be mentioned aryl groups and arylsulfonyl groups substituted with a halide, a nitro, a nitroso, a sulfonyl, a hydroxyl, a carboxyl, an acyl, an alkyloxy, an amino, an alkyl, an acylamino or an alkylamino group.

General formula (II)

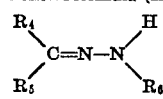

wherein $R_4$ represents hydrogen atom, an alkyl group, a substituted alkyl group, an aryl group, or a substituted aryl group; $R_5$ represents an alkyl group, a substituted furyl group, a chlorine atom, or a substituted aryl group; wherein said $R_4$ and $R_5$ together may form a ring comprising carbon atoms, nitrogen atoms, sulfur atoms or the like; $R_6$ represents a hydrogen atom, a carbamoyl group, a substituted oxaloyl group, or an aryl group; and wherein said $R_6$ and $R_4$ together also may form a ring. Substituents on the alkyl and aryl groups are as set forth above.

Examples of the aforesaid compounds of the preesnts invention are as follows:

(1) Hydrazine sulfate $$NH_2NH_2 \cdot H_2SO_4$$

(2) Hydrazine-D-tartrate $$NH_2NH_2 \cdot C_4H_6O_6$$

(3) Methylhydrazine $$H_3CNHNH_2$$

(4) 2-Hydroxyethylhydrazine $$HOC_2H_4NHNH_2$$

(5) Benzylhydrazine

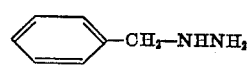

(6) N,N-Dimethylhydrazine

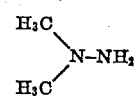

(7) N-Aminohomopiperidine

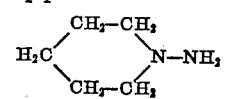

(8) N-Aminomorpholine

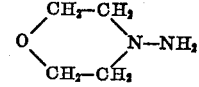

(9) N-Benzyl-N-phenylhydrazine

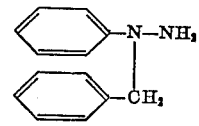

(10) N-Methyl-N-phenylhydrazine

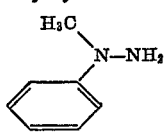

(11) o-Nitrophenylhydrazine

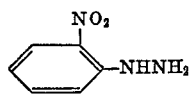

(12) p-Methylphenylhydrazine

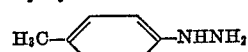

(13) Ammonium hydrazinedisulfonate $H_4NO_3SNHNHSO_3NH_4$

(14) Azobenzenephenylhydrazine-β-sulfonic acid

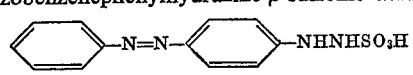

(15) Benzoylhydrazine

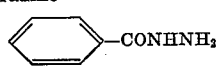

(16) α-Picolinic acid hydrazide

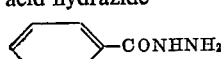

(17) Isonicotinic acid hydrazide

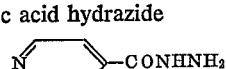

(18) 2-Hydroxy-3-naphtoic acid hydrazide

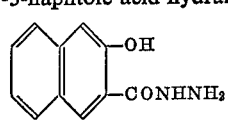

(19) Girard T

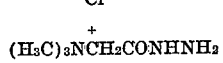

(20) Oxalyhydrazine $(CONHNH_2)_2$

(21) Adipic acid hydrazide $—(CH_2CH_2—CONHNH_2)_2$

(22) Phenylglycine hydrazide

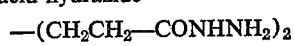

(23) Luminol

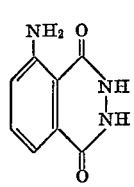

(24) Carbohydrazide $NH_2NHCONHNH_2$

(25) β-Acetylphenylhydrazine

(26) Diphenylcarbazide

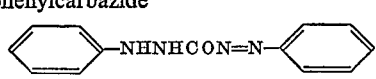

(27) Di-β-naphthylthiocarbazone

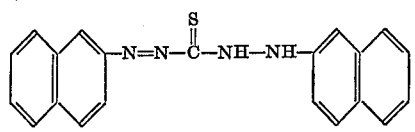

(28) Thiosemicarbazide hydrochloride

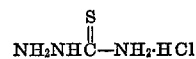

(29) Dithizone

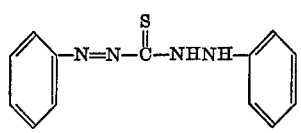

(30) Nitrofurazone

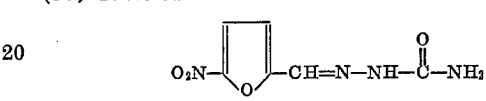

(31) Cyclopentanone semicarbazone

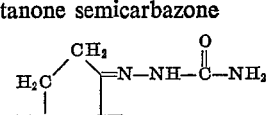

(32) Benzenesulfonyl hydrazide

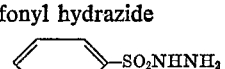

(33) p-Toluenesulfonyl hydrazide

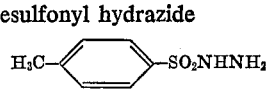

(34) Ethyl-α-butylacetoacetate semicarbazone

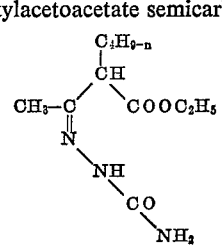

(35) Acetophenone hydrazone

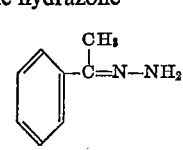

(36) p-Aminoacetophenone hydrazone

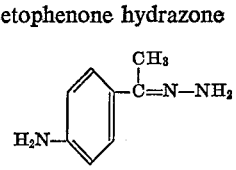

(37) o-Tolylhydrazine

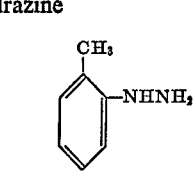

(38) m-Tolylhydrazine

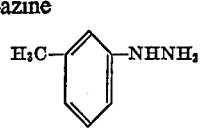

(39) p-Nitrophenylhydrazine

(40) Phenylhydrazine nitrate

(41) 3-Chloroindazole

(42) 2-Pyrazoline

(43) 3-Methylbenzothiazolone hydrazone

(44) m-Hydroxybenzaldehyde semicarbazone

(45) Phenylhydrazine p-toluene sulfonate

(46) 4-Amino-1,2,4-triazole

(47) Acetone phenylhydrazone

(48) Levulinic acid methylesterphenylhydrazone

(49) Cupferazone

(50) 4-Phenylsemicarbazide

(51) 1-Phenyl-5-pyrazolone-3-carboxylic acid hydrazide

(52) Phthalic acid monophenylhydrazide

(53) β-Phenoxyacetic acid phenylhydrazide

(54) Succinic acid monophenylhydrazide

(55) β-Acetyl-p-tolylhydrazide

(56) 1-Phenyl-4-methyl-3-pyrazolidone

These compounds may be prepared by well known methods (cf.; for example, R. B. Wagner; "Synthetic Organic Chemistry"; New York, 1953, John Wiley & Sons Co.) and are commercially available.

In the present invention, a silver halide is used in the form of a silver halide photographic emulsion layer for increasing the difference in reactivity between the areas irradiated by electromagnetic waves or particle rays and the areas which have not been irradiated, that is, for increasing the selectivity of the reaction.

It has already been reported to use a hydrazine as a developing agent (cf., for example, G. I. P. Levenson; "Journal of Photographic Science"; 15 (4), 158–163 (1967)), which teaches that it can be used as a developing agent at a high pH. Also it is known that an aryl hydrazine, an alkylhydrazine, and semicarbazide can be used as developing agents (C. E. K. Mees, "The Theory of the Photographic Process"; Chap. XIV). Also, as is well known, hydrazines are known as reducing agents, polymerization accelerators or polymerization initiators for redox polymerizations (cf., e.g., Italian Patent No. 541,925; German Pat. No. 1,028,782; U.S. Pat. No. 2,822,368; German Pat. No. 1,032,536; U.S. Pat. No. 2,947,118; and K. Rajat et al., "Journal of Polymer Science"; Part C, No. 16, 141 (1966). However, the polymerization disclosed in the above patents and report are all concerned with so-called redox polymerizations, that is, the polymerization of vinyl monomers occurs over the entire region where the oxidizing and reducing agents exist independent from light exposure. One the other hand, in the present invention, the silver halide acts as an oxidizing agent and hence it is important that the period of initiating the polymerization of the vinyl monomer is varied according to the presence of development centers on the silver halide particles, that is, the reaction proceeds at a high rate at those portions of the silver halide emulsion which have been irradiated by electromagnetic waves or particle rays.

The reaction mechanism (how the polymerization of the vinyl compound occurs as the result of the reduction of silver halide with the aforesaid hydrazine derivative) has not yet been clearly determined. However, from the facts that a compound which causes radical polymerization is generally utilized, that the polymerization can proceed in an aqueous solution and that a radical polymerization inhibitor retards the reaction, it is considered that the polymerization proceeds by means of a free radical mechanism. However, it has not yet been clarified whether radicals are formed directly by the reaction of the silver halide and the aforesaid hydrazine derivative or whether the radicals are formed by a further coaction with water, oxygen, etc., in the system.

When a vinyl compound is added to a reaction system after reducing the exposed silver halide particles with the aforesaid hydrazine derivative, occurrence of polymerization is not observed and therefore, it is clear that the polymerization of the vinyl compound occurs simultaneously with the reduction of the silver halide. Thus, it is believed that an intermediate product of silver halide and the hydrazine derivative as mentioned above contributes to the initiation of the reaction.

As silver halide is a one-electron oxidizing agent, it is suspected that a radical is formed by the oxidation of $N_2H_4$. However, Levenson has proposed the following in the above-mentioned report:

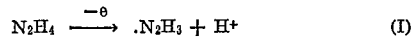

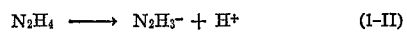

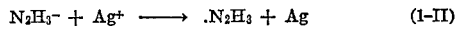

Formula 1 has been obtained from the study of oxidation using an iron salt as oxidizing agent which is a one-electron oxidizing agent in an alkaline state as is AgX.

Also, it is known that $.N_2H_3$ is readily decomposed into nitrogen from other experiments with electrolytic oxidation (cf.; e.g., G. V. Vitritskaya & V. S. Daniel-Bek; "Elektro Kimiya"; 3 (8), 973–977 (1967) (Chemical Abstract, 67, 113165J). Further, although the experiments were conducted in the acid state, hydrazine radical was observed by using an electron spin resonance absorption spectrum (cf., e.g., J. Q. Adamas & J. R. Thomas; "Journal of Chemical Physics"; 39, 1904 (1963)).

Although the intermediate oxidation product of the hydrazine derivative, which initiates the polymerization of vinyl monomer as in the present invention, has not been identified, it can be presumed, from the fact that the polymerization proceeds in a radical reaction, that the following intermediate products will be formed during the polymerization reaction;

(a) 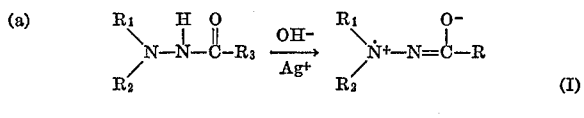

(b) 

(c) 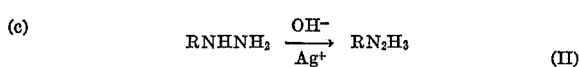

Although other various mechanisms may be considered, a radical of type (I) or (II) is considered to cause the polymerization of a vinyl or vinylidene monomer. The polymerization of the present invention is caused by the hydrazine radical formed by the oxidation of silver halide and the rate of reaction is considered to be influenced by the reaction rate of the silver halide, that is, the presence or absence of the latent image in the silver halide photographic emulsion layer.

When the polymerization reaction is stopped after a proper period of time, a high molecular weight compound is found to be formed selectively at only the areas irradiated by electromagnetic waves or particle rays; however, when the polymerization reaction is further extended, the high molecular weight compound will be formed at the areas not irradiated also. However, such a phenomenon is the same as the so-called fog. That is, the phenomenon that, when an exposed silver halide photographic emulsion layer is developed for a longer period of time in ordinary photography, not only the exposed areas but also the unexposed areas are darkened similarly and hence the aforesaid phenomenon does not effect the practicability of the process of this invention.

As a method of forming a polymer image by utilizing the light sensitivity of silver halide, there is known a so-called tanning development wherein gelatin is cross-linked by the oxidation product of a developing agent. However, in such a known method, the material imagewisely formed is limited to cross-linked gelatin. On the other hand, in the present invention, polymer images having various desired properties can be obtained by suitably selecting vinyl compounds to be employed. Hence, images having properties that have never been obtained by images formed by the cross-linkage of gelatin, e.g., dyeing affinity, chemical resistance, and the like, can be obtained.

It has also been found that when sulfite ions are present in the reaction system of the present invention, the polymerization of the vinyl compounds is accelerated.

The sulfite ions may be added to the reaction system either in the form of a compound, which contains sulfite ions, such as alkali metal or ammonium sulfites or bisulfites, or in the form of a compound which will give sulfite ions as the result of hydrolysis, such as pyrosulfites of alkali metals or ammonium or the adducts of bisulfites with aldehydes, such as formaldehyde or glyoxal. Although the amount of the sulfite ions to be added depends upon the kind and the amount of the reducing agent and the vinyl compound to be employed, the pH of the system, and the like, more than 0.05; preferably more than 0.2 mole per liter of the system has been found to be effective. The upper limit of sulfite ions is not critical. However, an upper limit of 15 moles per liter has been found suitable.

It is well known in the art to add a sulfite to photographic developers, and in such cases it is believed that the sulfite prevents the auto-oxidation of the developing agent and the occurrence of uneven developmnt by reacting with the oxidation product of the developing agent, such as hydroquinone or p-aminophenol (cf.; for example, C. E. K. Mees; "The Theory of the Photographic Process"; 2nd edition, published by McMillan Co. in 1954, p. 652). It should be noted that since, in the process of the present invention, the polymerization is initiated by the intermediate oxidation product of the hydrazine, hydrazide or hydrazone with silver halide, the polymerization accelerating effect by the sulfites is fundamentally different from the aforesaid action thereof for removing the oxidation product in an usual developer.

If the sulfite simply removes the oxidation products as in the conventional developing processes, the polymerization will be rather inhibited than promoted. Also sulfites are well known reducing agents for oxidation-reduction reactions and, hence, it may be considered that the polymerization is initiated by a silver halide-sulfite ion system. However, in the experiments performed in this invention, almost no polymerization by such a system was observed when the reducing agent, as will be mentioned below, was not present in the reaction system.

While the mechanism of the action of the sulfite in the process of the present invention is not obvious, it seems to be reasonable to suppose that the sulfite prevents the polymerization inhibition action of the oxygen in the system.

The development and the polymerization by the hydrazine derivatives used in the present invention can also be promoted by using them together with a small amount of an ordinary photographic developing agent or by preprocessing the silver halide emulsion layer in an ordinary developer solution. This is similar to the phenomenon that development and polymerization by a resorcinol, a methaminophenol, a phenol, a 5-pyrazolone, or a naphthol are promoted by their use. together with a small amount of an ordinary developing agent.

As such ordinary photographic developing agents which may be used in the present invention, there are two types of compounds, one of which is represented by the following general formula:

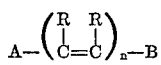

A and B represent —OH, —NH$_2$ or —NHR, R represents alkyl or aryl or derivatives thereof, as set forth in regard to general Formula I, and $n$ is a positive integer, preferably less than 7, and the other type include such as 1-aryl-3-oxopyrazolidines, and 1-aryl-3-iminopyrazolidines. These ordinary photographic developing agents themselves have no ability to initiate polymerization of vinyl compounds but can promote the polymerization reaction by promoting the developing action of a reducing agent having the ability to initiate the polymerization of vinyl compounds.

Vinyl compounds which may be employed in the present invention include normally liquid or solid compounds capable of addition polymerization and mixtures thereof. Examples of such vinyl compounds are acrylamide, acrylonitrile, N-hydroxymethylacrylamide, methacrylamide, N-t-butylacrylamide, methacrylic acid, acrylic acid, calcium acrylate, sodium acrylate, methyl methacrylate, methyl acrylate, ethyl acrylate, vinylpyrrolidone, 2-vinylpyridine, 4-vinylpyridine, 2-methyl - N - vinylimidazole, potassium vinylbenzenesulfonate, vinylcarbazole and the like. For the present invention, compounds having two or more vinyl groups are particularly suitable, and such compounds may be used alone or in mixture with the aforesaid compounds having one vinyl group. Examples of such compounds having two or more vinyl groups are N,N'-methylenebisacrylamide, ethyleneglycol dimethacrylate, triethylene glycol dimethacrylate, diethylene glycol dimethacrylate, polyethylene glycol dimethacrylate, divinyl ether, divinylbenzene, bisphenol-A-dimethacrylate, trimethylolpropane trimethacrylate and the like.

In the present invention, water-soluble vinyl compounds are preferably used, but water-insoluble vinyl compounds may be polymerized by adding the compounds to the reaction system as an emulsion thereof. Emulsification for preparing the emulsion mentioned above may be conducted according to any conventional method using a suitable stirring means in the presence of a surface active agent and/or a high molecular weight compound.

As the electromagnetic waves or particle rays used in the present invention, any electromagnetic waves and particle rays which are sensitive to ordinary photographic light-sensitive emulsions can be employed. That is, infrared rays, X-rays, gamma rays, ultraviolet rays, electron beams, alpha rays and the like may be employed.

In order to practice the process of the present invention, it is necessary to first conduct two irradiation steps by electromagnetic waves or particle rays and then the reduction polymerization reaction. In particular, in the recording of images, it is necessary that the silver halide grains change their location little during the period between the irradiation and the polymerization of vinyl compounds in the reaction system. Accordingly, it is preferably that the reaction system is maintained in a highly viscous liquid or gel state. While photographic emulsions have some viscosity and are susceptible to gelation since they contain natural or synthetic high polymers, additional high polymer may be added to the emulsion before use if necessary.

On irradiation by electromagnetic waves or particle rays, the silver halide particles may be in an aqueous solution or held in a dry gel. That is, the highly viscous or gelled photographic emulsion on a suitable support or substrate may be subjected to the irradiation either in the undried state or the dried state. As the reduction and the polymerization take place at the same time, the reduction should be conducted in the presence of the vinyl compound or compounds, however, in the present invention, both the vinyl compound and the hydrazine derivative mentioned above may be incorporated in the photographic emulsion layer before exposure, or only one of them may be incorporated in the photographic emulsion layer before exposure and the other may be added to the system after the exposure. Furthermore, it is possible to add both the compounds to the emulsion after exposure.

As the reduction and polymerization must be conducted in the presence of water, it is necessary to conduct the reduction and the polymerization in an aqueous solution or in a wet gel state.

In general, the reaction of the present invention proceeds smoothly in an alkaline state but the optimum pH of the reaction system depends upon the natures and the concentrations of silver halide, the reducing agent, and the high molecular weight compound used as binder. In general, the polymerization reaction may be conducted at a pH higher than about 8, preferably higher than 9.

In the case of using a photographic silver halide emulsion, in the form of a layer formed on a support, the reaction can be conducted by immersing the silver halide emulsion layer in an aqueous alkaline solution after the irradiation. In this case, it is preferable to incorporate the reducing agent or the vinyl compound in the aqueous alkaline solution.

The polymerization reaction of the present invention can be readily stopped by acidifying the system, e.g., to a pH of less than 5, but the reaction may also be stopped by cooling, removing the reaction products by washing, by dissolving the silver halide in a photographic fixing solution, or by adding a polymerization inhibitor to the reaction system.

In the case wherein a high polymer as a medium for the silver halide and a vinyl compound monomer are preliminarily formed into a film or coating, it is desirable to add a small amount of a thermal polymerization inhibitor in order to prevent the spontaneous overall thermal polymerization of the vinyl compound. As the thermal polymerization inhibitor, any compounds known as thermal polymerization inhibitors of conventional radical polymerization may be used. Examples of these compounds are p-methoxy-phenol, hydroquinone, alkylhydroquinone, 2,6-di-t-butyl-p-cresol and the like.

When the vinyl monomer is incorporated in the system from the first, the weight thereof is usually from 1/30 to 30 times, preferably 1/4 to 4 times, the weight of the high molecular weight compound which is originally present in the system. Also, it is preferable that the amount of silver halide to be used is 1/20 to 2 times, preferably 1/10 to 1/2 times by weight that of the high polymer preliminarily added to the system. Furthemore, when the reducing agent is preliminarily incorporated into the reaction system, the amount of the reducing agent is preferably 1/10 to 20 moles per one mole of silver halide to be used. Further, when a thermal polymerization inhibitor is used, the preferable amount thereof is 10 p.p.m. to 2/100 of the weight of the vinyl monomer.

In the case where the vinyl compounds are added to the processing solution, it is usually preferable to dissolve them in as high a concentration as possible. Hence, the preferable concentration of the monomers is mainly determined by the solubility of the vinyl compounds in the processing solution. When the hydrazine derivatives are added to the processing solution, the optimum concentration thereof depends upon the nature of the derivatives used, but is preferably $\frac{1}{1000}$ mole to 5 moles, preferably $\frac{1}{50}$ to 1 mole per one liter of solution.

As in ordinary silver halide photographic processes, there can be any desired time interval between the exposure to electromagnetic waves or particle rays and the polymerization. In some cases, according to the properties of the photographic emulsion to be used and the conditions and the time interval of allowing the emulsion layer to stand, the effect of the exposure may be diminished to some extent and in such case the desired effect can be obtained by increasing the amount of exposure.

When applying the process of the present invention in the recording of images, it is possible to make use of differences in solubility, light scattering, tackiness, dye-receptivity and other physical and chemical properties between the vinyl compounds and the polymers thereof. A relief image of a high molecular weight compound may be formed by dissolving off the unpolymerized portions after irradiation and polymerization, making use of the difference in solubility between the polymerized portions and the unpolymerized portions so as to leave highly polymerized compound only in the irradiated areas.

In this case, it is convenient that the high polymer originally present in the system be washed away together with the unpolymerized vinyl compound. Accordingly, it is preferable that the high polymer originally present in the system is linear and substantially uncrosslinked or, if crosslinked, that it be susceptible to chain fission or break-up of the crosslinkages and that the high molecular weight compound formed by the polymerization of the vinyl compound is a crosslinked one of the so-called three-dimensional structure. For this purpose it is convenient to employ a compound having a plurality of vinyl groups as mentioned above, either alone or in combination with a compound having only one vinyl group. It is, however, not essential to employ a compound having a plurality of vinyl groups, since there are many cases where great differences are present between the portions containing the high molecular weight compound formed by the polymerization of the vinyl compound and the portions not containing such high molecular weight compound, even if the resulting high molecular weight compound is a two-dimensional water-soluble one, due to the interaction of the high molecular weight compound formed by the polymerization of the vinyl compound and the high polymer originally present in the system, as in the case of polyacrylic acid and gelatin.

The polymer image formed by the process of the present invention can be applied to various printing processes.

The process of the present invention may be applied to form color images. In the color image forming process, a vinyl monomer having a group capable of being charged by electrolytic dissociation thereof or the addition of hydrogen cations is used to form a polymer image and then the polymer image is selectively dyed by a dye having the charge opposite to that of the image polymer. Also, the color image or dye image thus formed may be transferred to other image-receiving supports by various known methods.

The addition polymerizable vinyl compounds capable of being charged by electrolytic dissociation or the addition of hydrogen cations to be employed in such color image forming process of the present invention are ones capable of forming high molecular weight compounds having negative charges and ones capable of forming high molecular weight compounds having positive charges.

Examples of vinyl compounds forming high molecular weight compounds having negative charges are vinyl compounds having a carboxyl group, such as acrylic acid, methacrylic acid, itaconic acid, and maleic acid; vinyl compounds having a metal salt or an ammonium salt of a carboxyl group, such as ammonium acrylate, sodium acrylate, potassium acrylate, calcium acrylate, magnesium acrylate, zinc acrylate. cadmium acrylate, sodium methacrylate, calcium methacrylate, magnesium methacrylate, zinc methacrylate, cadmium methacrylate, sodium itaconate, and sodium maleate; vinyl compounds having a sulfonic acid group, such as vinyl sulfonic acid and p-vinylbenzene sulfonic acid; and vinyl compounds having a metal salt or ammonium salt of sulfonic acid, such as ammonium vinyl sulfonate, sodium vinylsulfonate, potassium vinylsulfonate, and potassium p-vinylbenzenesulfonate.

Examples of vinyl compounds forming polymers capable of having positive charges are vinyl compounds having a basic nitrogen atom, such as 2-vinylpyridine, 4-vinylpyridine, 5 - vinyl - 2 - methylpyridine, N,N-dimethylaminoethyl acrylate, N,N-dimethylaminoethyl methacrylate, N,N-diethylaminoethyl acrylate, and N,N-diethylaminoethyl methacrylate and vinyl compounds having quaternary salt nitrogens prepared by reacting the bases of the vinyl compounds having basic nitrogen atoms and methyl chloride, ethyl bromide, dimethyl sulfate, diethyl sulfate, methyl p-toluenesulfonate, or the like.

These compounds may be prepared by well-known methods and are also commercially available. The aforesaid compounds may be used alone or in combination thereof. Also, they may be used together with a water-soluble addition polymerizable vinyl compound having no charges. Examples of vinyl compounds which may be used with the aforesaid vinyl compounds capable of having charges are acrylamide, N-hydroxymethyl acrylamide, methacrylamide, methyl methacrylate, vinylpyrrolidone, N,N-methylenebisacrylamide, triethylene glycol dimethacrylate, polyethylene glycol dimethacrylate and the like.

In the case of using vinyl compounds having no charges, the amount of the vinyl compound shall be so selected, considering the reactivity of the compound, that only that vinyl compound shall be so selected considering the reactivity of the compound, that only that vinyl compound is polymerized so as to form a high polymer capable of having substantially no electrolytically dissociable groups.

As dyes capable of having charges by being electrolytically dissociated and which may be used in the color image forming process, ordinary acid dyes and basic dyes are generally employed. When the vinyl compound forming a high polymer capable of having negative charges is used, a basic dye is used, while when the vinyl compound forming a high polymer capable of having positive charges is used, an acid dye is employed. That is, as the basic dye has positive charge, it dyes the high polymer capable of having negative charge, while as the acid dye has negative charge, it dyes the polymer having positive charge. Thus, a color image or dye image is obtained at the high molecular weight compound formed imagewise by the polymerization of the vinyl monomer or monomers.

When gelatin is employed as a binder for photographic silver halide emulsion, the dyeing must be conducted considering the isoelectric point of the gelatin, since gelatin is an amphoteric electrolyte. That is, gelatin has a negative charge at a pH higher than the isoelectric. That is, gelatin has a negative charge at a pH higher than the isoelectric point of the gelatin but has a positive charge at a pH lower than the isoelectric point. Thus, in the case where a high molecular weight compound having a negative charge is formed, only the polymer image is dyed, without dyeing the gelatin, by dyeing the polymer image of the emulsion layer at a pH lower than the isoelectric point of the gelatin in the emulsion layer. Also, in such cases, only the high polymer image can be dyed by first uniformly dyeing the gelatin silver halide emulsion layer having the polymer image with a basic dye at a pH higher than the isoelectric point of the gelatin and thereafter washing away the dye at the areas of the emulsion layer having no polymer image with a washing solution having a pH lower than the isoelectric point of gelatin.

In the case of dyeing a polymer image having a positive charge with an acid dye, the dyeing procedure may be conducted at a pH higher than the isoelectric point of the gelatin.

If the pH is too low or too high, the solubility of dyes to be employed will be reduced and the electrolytic dissociation of the high polymer to be endowed with charges thereby is hindered as a matter of course. The optimum pH range of the system depends upon the natures of the vinyl compounds and dyes to be employed as well as the nature of gelatin but in the case of using ordinary lime-treated gelatin having an isoelectric point of about 4.9, the pH range is preferably 2.5–4.5 when the image of the high molecular weight compound having a negative charge is dyed with a basic dye and 5.0–8.0 when the image of the high molecular weight compound having a positive charge is dyed with an acid dye.

As the acid dyes employed in the present process, there may be mentioned C.I. Acid Yellow 7 (C.I. 56205), C. I. Acid Yellow 23 (C. I. 19140), C. I. Acid Red 1 (C. I. 18050), C. I. Acid Red 52 (C. I. 45100), C. I. Acid Blue 9 (C. I. 42090), C. I. Acid Blue 45, C. I. Acid Blue 62 (C. I. 62045), and the like. Examples of the basic dyes to be used in the above process are C. I. Basic Yellow 1 (C. I. 49005), C. I. Basic Yellow 2 (C. I. 41000), C. I. Basic Red 1 (C. I. 45160), C. I. Basic Red 2 (C. I. 50240), C. I. Basic Blue 25 (C. I. 52025), C. I. Basic Violet (C. I. 42555), C. I. Basic Violet 10 (C. I. 45170), and the like. The color index numbers shown above are cited from Color Index, 2nd edition, and all of the aforesaid dyes are commercially available under various trade names.

After conducting the irradiation and then the reduction and polymerization of the vinyl monomer or monomers, the unpolymerized vinyl monomer or monomers are washed away to leave a polymer image. A polymer is generally less soluble than the monomer and when a high polymer such as gelatin which has been present originally as a binder for the silver halide photographic emulsion layer is left in the system without being dissolved in water, the high molecular weight compound cannot be diffused in the emulsion layer. Thus, only the polymer portions remain to provide the image. In this case, when a vinyl monomer having more than two vinyl groups is employed together with a monovinyl compound, the insolubility and diffusion resistance of the high polymer formed by the polymerization thereof can be further improved.

By dyeing after conducting the polymerization of the vinyl compound, as mentioned above, a colored polymer image is obtained. The color image can be utilized as a sharp and beautiful color photographic image by removing the silver halide by a fixing procedure and dissolving away the silver image by the actions of an oxidizing agent and a solvent for the silver salt. In the case where a reducing agent having a very good polymerization initiating efficiency is employed, the polymerization reaction occurs sufficiently even when only a slight amount of reduced silver is formed. Hence, in such a case, it is unnecessary, or almost unnecessary, to remove the silver image by oxidation.

The color image thus formed may be transferred to other supports. For transferring the color image, the emulsion layer, bearing thereon the color image thus formed, is wetted by a solvent for the dye, such as methanol, water or an aqueous solution of an acid, a base or a salt and then the layer thus wetted is closely brought into contact with an image receiving support. As image receiving supports, there may be employed ordinary paper, paper having coated thereon a hydrophilic polymer layer or a gelatin layer, film having coated thereon a hydrophilic polymer layer or a gelatin layer and the like.

In the case of transferring the color image onto a support having a gelatin layer, it is preferable to employ an image receiving support which has been subjected to mordanting processing with an aluminum salt or the like as in conventional dye transfer processes.

When an image of a high molecular weight compound having charges is once formed, a plurality of reproductions or copies can be obtained by dyeing the polymer image and then transferring the color onto image-receiving supports an mentioned above. Since a plurality of reproductions or copies can be obtained from one color image and the polymer image can be repeatedly dyed, many reproductions can be readily obtained.

EXAMPLE 1

A fine particle gelatino silver chlorobromide photographic emulsion having a pH of 5.8 and pAg of 7.6 and containing silver chlorobromide (chlorine:bromide=7:3 in mole ratio) corresponding to about 42 g. of silver and also about 60 g. of gelatin per liter was divided into two portions. One of them was exposed. For the purpose of exposure, about 200 ml. of the aforesaid silver halide emulsion which was in a liquid state at about 35° C. was spread over the bottom of a vat of 20 cm. x 25 cm. and then exposed to light of about 300 lux for about 5 minutes under stirring. Each 10 ml. of the exposed and unexposed silver halide emulsions was poured in a separate test tube having a diameter of 1.6 cm. After adding 6 ml. of water to each of the test tubes, 4.0 g. af acrylamide was dissolved in the mixture and then $10^{-3}$ mole of the reducing agent shown in Table I was further added to the mixture. After stirring the system sufficiently, the temperature thereof was adjusted to one shown in Table I and the test tubes were set in a heat insulating material. The insulating material was composed of a polystyrene foam having a thickness of about 2 cm. and the system was immersed in a water bath maintained at the temperature shown in Table I. Immediately after, an aqueous, one normal, sodium hydroxide solution in an amount shown in Table I was added to the system and the change in temperature of the system was measured in each case by means of a thermister type temperature recorder. In the exposed emulsion, acrylamide was polymerized and the temperature of the system raised by the heat of polymerization.

On the other hand, in the system of the unexposed emulsion, the temperature rise was not observed or was very slow even where observed. Furthermore, in the system where the exposed emulsion was used, it was observed that the silver halide was reduced to silver providing a brownish color.

As mentioned above, from the generation of the heat of polymerization in the exposed emulsion, it is clear that polymerization occurred in the system. Heat may be generated by the reduction of silver halide with no relation to the polymerization of the vinyl compound but the amount of heat thus generated is very slight and such a slight change of temperature cannot be detected by the temperature detector employed in the experiment. For example, when $10^{-3}$ mole of hydroquinone is used, a silver halide is reduced into black silver but no generation of heat is observed in this reaction.

In the case of employing the unexposed emulsion, the rise of temperature may be sometimes observed when the reaction is conducted for a longer period of time than necessary but this phenomenon is similar to a so-called fog, the phenomenon that in ordinary photographic emulsion, unexposed portions are also developed when the emulsion is developed for a longer period of time. Thus, such a phenomenon does not adversely affect the practicability of the process of this invention as a photographic process. The chemicals used in the above experiment, the temperature of the water bath, the amount of alkali, the reaction period of time, and the temperature of the reaction system are shown in Table I.

TABLE I

| No. | Compound | (A) | (B) | (C) | (D) (D') | (D'') |
|---|---|---|---|---|---|---|
| 2 | Hydrazine-D-tartrate | 50 | 0.5 | 14 | 100 | 50 |
| 13 | Ammonium hydrazinesulfonate | 50 | 0.3 | 26 | 89 | 72 |
| 37 | o-Tolylhydrazine hydrochloride | 50 | 4.0 | 33 | 58 | 51 |
| 47 | Acetonephenyl-hydrazone | 60 | 3.0 | 21 | 82 | 67 |
| 48 | Levulinic acid methylphenyl hydrazone | 60 | 1.0 | 40 | 100 | 74 |
| 49 | Cupferazone | 50 | 2.0 | 9 | 96 | 50 |
| 50 | 4-phenylsemicarbazide | 50 | 2.0 | 18 | 89 | 74 |
| 22 | Phenylglycine hydrazide | 60 | 3.0 | 5 | 69 | 61 |

NOTE.—(A): temperature of water bath in ° C.; (B): amount of 1N NaOH in ml.; (C): reaction time in min.; (D): temperature in ° C. after reaction time (C); (D'): exposed emulsion system; (D''): unexposed emulsion system.

In any case, the polymerization reaction occurred predominantly in the systems employing the exposed emulsions.

EXAMPLE 2

In the example, a light-sensitive photographic film having a gelatino silver chloroiodo-bromide emulsion layer was processed in a solution containing hydrazine and sodium methacrylate to conduct imagewise polymerization.

The light-sensitive film was prepared as follows. After undercoating the both surfaces of a polyethylene terephthalate film, one surface was coated with an antihalation layer and the other surface was coated with a fine particle gelatino silver halide emulsion containing about 0.7 mole of chlorine, about 0.3 mole of bromine and about 0.001 mole of iodine per one mole of silver and about 100 g. of gelatin, said emulsion having been further mixed with a merocyanine dye having the maximum sensitivity at 500 m$\mu$ as a sensitizing dye, a mucochloric acid in an amount of about 1.5 g. per 100 g. of gelatin as a hardening agent, a suitable stabilizer and a surface active agent so that 50 mg. of silver was contained in 100 cm.$^2$ of said layer, and thereafter the silver halide emulsion layer was further coated with a protective layer comprising gelatin in a thickness of about 0.8 micron. The photographic light-sensitive film was a type usually used for making half tone images or line images by photoengraving process.

The light-sensitive film thus prepared was exposed for 2 seconds through a negative to light of about 100 lux and then immersed for 30 minutes at 30° C. in a solution having the following composition under stable red light:

Sodium methacrylate _____ 75 g.
Hydrazine-D-tartrate hydrochloride (Compound 2) _____ 1.82 g.
2 N aq. sodium hydroxide soln. __ Amount necessary to adjust the pH of the system to 11.5.
Potassium methabisulfite _____ 3 g.
Water _____ 75 ml.

By the above procedure, a faint brown image was formed at the exposed portions. After washing the sample with an aqueous 1.5% acetic acid solution for 30 seconds, the sample was fixed in the fixing solution having the following composition:

Sodium thiosulfate (anhydrous) _____ g__ 150
Potassium methabisulfite _____ g__ 15
Water to make 1 liter.

After fixing and sufficiently washing the sample, it was immersed for 5 minutes at room temperature in a 0.1% aqueous solution of a red basic dye, Rhodamine 6 G.C.P. (C.I. Basic Red 1), and thereafter the emulsion layer was washed for 5 minutes with a 5% aqueous solution of acetic acid, whereby the dye attached to the other portions of the layer than those having the aforesaid brown image was washed away and the image portions were left in red. As the brown image was a silver image, it could be easily washed away by a Farmer's reducer. By removing the silver image, a sharp red image was obtained. The order of the dyeing and the removal of silver image could be reversed. That is, a sharp red image as above could be obtained by first removing the silver image to make the emulsion layer colorless and transparent and thereafter dyeing the layer as mentioned above.

The color image thus obtained could be transferred onto a paper by a simple procedure. That is, when ordinary writing paper was slightly wetted with methanol, and the color image thus obtained was closely brought into contact with the wetted paper, after 30 seconds the former was separated from the latter, and the color image was transferred onto the paper.

By replacing the aforesaid dye with an 0.1% aqueous solution of Crystal Violet V. I. Basic Violet 3, a blue-purple image was obtained and the color image could also be transferred.

Also, by using a 0.1% aqueous solution of Auramine 0–100, C.I. Basic Yellow 2, a yellow image was obtained.

Furthermore, by using a 0.1% aqueous solution of Basic Blue G.O., C.I. Basic Blue 25, a blue image was obtained.

When transferring the color image, it is unnecessary to remove the silver image and silver halide. That is, by conducting the development and polymerization, subjecting the image bearing layer to a stopping procedure, and after washing with water, directly dyeing and transferring the color image, a satisfactory image transfer could be conducted.

EXAMPLE 3

The same procedure as in Example 2 was followed using the reducing agents shown in Table II. In the example, however, the composition for the processing solution was as follows:

Sodium methacrylate _____ 75 g.
Reducing agent _____ Shown in Table II.
Water _____ 75 ml.
2 N aq. sodium hydroxide solution _____ Necessary to adjust the pH to the value shown in Table II.
Potassium methabisulfite _____ 3 g.

After processing the sample in the above solution for the period of time shown in Table II at 30° C., the sample was subjected to the same procedure as in Example 2. The transmission densities of the exposed portions and the unexposed portions to green light of the sample dyed by a 0.1% aqueous solution of Rhodamine 5 G.C.P. were measured. The results are shown in Table II together with the kind of reducing agent, the amount thereof, the processing period of time, the optical density before dyeing, and the optical density after dyeing.

As clear from Table II, it was confirmed that, at the exposed portion, the dyeing density was higher and thus the polymerization reaction has occurred selectively.

TABLE II

| Number | Reducing agent | (A) | (B) | (C) | | (D) | | (E) |
| --- | --- | --- | --- | --- | --- | --- | --- | --- |
| | | | | (C') | (C'') | (D') | (D'') | |
| 1 | Hydrazine sulfate | 11.02 | 25 | 0.06 | 0.67 | 0.08 | 1.00 | 11.47 |
| 3 | Methylhydrazine | 2.07 | 30 | 0.07 | 0.36 | 0.40 | 2.06 | 11.50 |
| 4 | 2-hydroxyethyl hydrazine | 0.02 | 70 | 0.08 | 0.30 | 0.08 | 0.66 | 11.90 |
| 5 | Benzylhydrazine | 1.95 | 30. | 0.08 | 0.31 | 0.09 | 0.87 | 9.15 |
| 6 | N,N-dimethyl hydrazine | 0.96 | 70 | 0.08 | 0.24 | 0.34 | 2.30 | 9.20 |
| 7 | N-aminohomopiperidine | 0.10 | 70 | 0.07 | 0.70 | 0.11 | 1.70 | 9.10 |
| 8 | N-aminomorpholine | 4.59 | 60 | 0.07 | 0.11 | 0.13 | 0.48 | 9.28 |
| 9 | N-benzyl-N-phenylhydrazine | 2.34 | 15 | 0.16 | 0.26 | 1.11 | 1.78 | 9.00 |
| 10 | N-methyl-N-phenylhydrazine | 0.01 | 50 | 0.06 | 0.24 | 0.27 | 0.56 | 9.10 |
| 11 | o-Nitrophenylhydrazine | 1.90 | 70 | 0.10 | 0.28 | 0.24 | 0.80 | 11.65 |
| 12 | p-Methylphenylhydrazine | 0.30 | 20 | 0.15 | 0.28 | 0.54 | 1.75 | 11.70 |
| 13 | Ammonium hydrazinedisulfonate | 10.17 | 20 | 0.07 | 0.52 | 0.08 | 1.36 | 11.50 |
| 14 | Azobenzebephenylhydrazine-β-sulfonic acid | 0.03 | 30 | 0.08 | 0.28 | 0.12 | 1.94 | 9.15 |
| 15 | Benzoylhydrazine | 1.36 | 70 | 0.08 | 0.25 | 0.13 | 0.82 | 11.60 |
| 16 | α-Picolic acid hydrazide | 1.37 | 50 | 0.14 | 0.26 | 0.20 | 0.90 | 11.70 |
| 17 | Isonicotinic acid hydrazide | 4.61 | 30 | 0.07 | 0.19 | 0.08 | 1.25 | 9.00 |
| 18 | 2-hydroxy-3-naphtoic acid hydrazide | 9.09 | 70 | 0.10 | 0.58 | 0.20 | 1.52 | 11.50 |
| 19 | Girard T | 1.67 | 70 | 0.15 | 0.45 | 0.40 | 2.85 | 11.55 |
| 20 | Oxalylhydrazine | 0.53 | 30 | 0.09 | 0.22 | 0.45 | 2.86 | 11.50 |
| 21 | Adipic acid hydrazide | 9.27 | 30 | 0.10 | 0.30 | 0.20 | 1.75 | 11.70 |
| 22 | Phenylglycine hydrazide | 3.50 | 70 | 0.07 | 0.25 | 0.14 | 0.70 | 11.60 |
| 23 | Luminol | 3.50 | 70 | 0.15 | 0.35 | 0.38 | 2.20 | 9.00 |
| 24 | Carbohydrazide | 4.05 | 60 | 0.30 | 0.54 | 1.58 | 4.00 | 9.30 |
| 25 | β-Acetylphenylhydrazine | 0.67 | 15 | 0.09 | 0.35 | 0.55 | 2.56 | 11.55 |
| 26 | Diphenylcarbazide | 2.42 | 15 | 0.12 | 0.32 | 0.50 | 1.54 | 11.65 |
| 27 | Di-β-naphthylcarbazone | (.22 | 70 | 0.08 | 0.30 | 0.08 | 0.66 | 11.90 |
| 28 | Thiosemicarbazide | 1.64 | 30 | 0.10 | 0.52 | 0.12 | 0.76 | 11.50 |
| 29 | Dithizone | 0.50 | 50 | 0.42 | 0.67 | 0.43 | 1.18 | 11.50 |
| 30 | Nitrofurazone | 0.50 | 30 | 0.09 | 0.27 | 0.15 | 1.44 | 9.00 |
| 31 | Cyclopentanonesemicarbazone | 1.86 | 30 | 0.10 | 0.27 | 1.40 | 3.86 | 11.50 |
| 32 | Benzenesulfonylhydrazide | 7.12 | 6 | 0.07 | 0.22 | 0.19 | 0.82 | 11.75 |
| 33 | p-Toluenesulfonylhydrazide | 0.84 | 20 | 0.09 | 0.24 | 0.15 | 1.16 | 11.50 |
| 34 | Ethyl-α-butylacetoacetate semicarbazone | 10.49 | 90 | 0.07 | 0.29 | 0.07 | 0.50 | 11.50 |
| 35 | Acetophenone hydrazone | 6.03 | 70 | 0.07 | 0.19 | 0.07 | 0.36 | 11.53 |
| 36 | p-Aminoacetophenone hydrazone | 0.73 | 70 | 0.07 | 0.19 | 0.07 | 0.26 | 11.58 |
| 37 | o-Tolylhydrazine | 0.05 | 20 | 0.07 | 0.28 | 0.11 | 2.50 | 11.50 |
| 38 | m-Tolylhydrazine | 0.05 | 20 | 0.07 | 0.52 | 0.30 | 1.93 | 11.60 |
| 39 | p-Nitrophenyl hydrazine | 0.05 | 39 | 0.33 | 0.52 | 0.42 | 2.26 | 11.50 |
| 40 | Phenylhydrazine nitrate | 0.05 | 30 | 0.07 | 0.21 | 0.31 | 1.95 | 11.50 |
| 41 | 3-chloroindazole | 6.84 | 30 | 0.06 | 0.21 | 0.07 | 2.17 | 9.15 |
| 42 | 2-pyrazoline | 3.15 | 70 | 0.09 | 0.18 | 0.10 | 0.38 | 11.50 |
| 43 | 3-methyl-2-benzothiazolone hydrazone | 2.15 | 70 | 0.07 | 0.17 | 0.57 | 2.98 | 9.10 |
| 44 | m-Hydroxybenzaldehyde semicarbazone | 3.00 | 70 | 0.07 | 0.21 | 0.07 | 0.40 | 11.50 |
| 45 | Phenylhydrazine-p-toluene sulfonate | 0.06 | 70 | 0.12 | 0.79 | 0.39 | 2.10 | 11.60 |
| 46 | 4-amino-1,2,4-triazole | 3.78 | 30 | 0.10 | 0.24 | 0.25 | 1.62 | 11.70 |
| 51 | 1-phenyl-5-pyrazolone-3-carboxylic acid hydrazide | 5.00 | 70 | 0.08 | 0.40 | 0.09 | 1.72 | 11.50 |
| 52 | Phthalic acid monophenylhydrazide | 6.00 | 10 | 0.13 | 0.24 | 1.80 | 2.78 | 9.00 |
| 53 | β-Phenoxyacetic acid phenylhydrazide | 6.00 | 50 | 0.13 | 0.42 | 0.30 | 2.08 | 11.55 |
| 54 | Succinic acid monophenylhydrazide | 9.00 | 10 | 0.24 | 0.84 | 1.40 | 2.70 | 11.50 |

NOTE.—(A): amount of reducing agent in grams; (B): processing time in minutes; (C): optical density of unexposed portions; (C'): before dyeing (C''): after dyeing; (D): optical density of exposed portions; (D'): before dyeing; (D''): after dyeing; and (E): pH of processing solution.

EXAMPLE 4

The same experiment as in Example 2 was repeated for a system containing no sulfite ions. Two samples were prepared and processed in processing solutions having the following compositions:

| | Sample 1 | Sample 2 |
| --- | --- | --- |
| Sodium methacrylate (g.) | 75 | 75 |
| β-Acetylphenylhydrazine (g) | 0.675 | 0.675 |
| 2 N aq. NaOH soln. (ml.) | 75 | 75 |
| pH of the system | 10.5 | 11.5 |

The samples were processed for 7 minutes and 15 minutes respectively in the solutions at 30° C. and then processed to the same post processings as in Example 2. Thereafter, the transmission density thereof to green light was measured, the results of which are shown in the following table:

TABLE III

| Sample No. | (A) | (B) | | (D) | |
| --- | --- | --- | --- | --- | --- |
| | | (B') | (B'') | (D') | (D'') |
| 1 | 7 | 0.07 | 0.41 | 0.27 | 1.52 |
| 1 | 15 | 0.20 | 1.27 | 1.41 | 4 |
| 2 | 7 | 0.08 | 0.70 | 0.35 | 0.55 |
| 2 | 15 | 0.35 | 1.55 | 2.38 | 4 |

NOTE.—(A): Processing time in minutes; (B): optical density of unexposed portions to green light (B'): before dyeing; (B''): after dyeing; (D): optical density of exposed portions to green light; (D'): before dyeing; (D''): after dyeing.

As understood from the results of Table III, even where no sulfite ions are present in the reaction system, the polymerization reaction had occurred selectively at the exposed portions although the optical density varied according to the pH value of the reaction system and the processing period time.

When the same experiment was conducted at a pH of 11.5 using 7.6 g. of 4-methyl-1-phenyl-3-pyrazolidone (Compound 56) instead of -acetylphenyl hydrazine, the following results were obtained by allowing the emulsion layer to stand in the processing solution for 35 minutes, which showed that the presence of sulfite ions is not an indispensable factor in the present invention, although it is a preferable factor.

| Optical density of unexposed portion | | Optical density of exposed portions | |
| --- | --- | --- | --- |
| Before dyeing | After dyeing | Before dyeing | After dyeing |
| 0.20 | 0.34 | 0.23 | 0.88 |

EXAMPLE 5

The light-sensitive photographic film of Example 2 was imagewise exposed and processed in a solution containing 1 - vinyl - 2,3 - dimethylimidazolium-p-toluene sulfonate, whereby the polymerization of a basic monomer was conducted imagewise.

That is, the light-sensitive film was exposed for 2 seconds through a negative having line image to light of about 100 lux and then immersed in a solution having the following composition under a stable red light to conduct development and polymerization:

1 - vinyl-2,3-dimethylimidazolium-
p-toluene sulfonate _____ 75 g.
o - Tolylhydrazine hydrochloride
(Compound 37) _____ 30 mg.
Potassium methabisulfite _____ 3 g.
2 N aq. NaOH soln. _____ That necessary to adjust the pH to 11.8.
Water _____ 75 ml.

The 1-vinyl - 2,3 - dimethylimidazolium-p-toluenesulfonate used above was prepared by reacting 1-vinyl-2-methylimidazole and methyl p-toluenesulfonate at room temperature and by recrystallizing the product from ethanol and ether. The melting point of the crystal obtained was 142.5° C.

When the silver halide emulsion layer was processed in the above processing solution for 50 minutes at 30° C., an image of a quanternary salt was formed together with a faint brown silver image. This was confirmed by the following procedure.

That is, after sufficiently fixing and water-washing the same as in Example 2, the polymer image was dyed by a 0.1% aqueous solution of a blue acid dye, Suminol Leveling Sky Blue R extra conc., C. I. Acid Blue 62 and then the emulsion layer was washed with a 1% aqueous solution of sodium bicarbonate to provide a blue image.

As the brown image was a silver image, it could be readily dissolved away by a Farmer's reducer. By removing the silver image, a sharp blue image was obtained. By reversing the order of dyeing and the removal of silver image as in Example 2, a sharp blue image was also obtained.

The color image thus formed could be transferred to a paper. That is, as in Example 2, the emulsion layer having the blue image was closely brought into contact with a paper wetted with methanol and after about 30 seconds, the paper was separated, whereby the blue image was transferred onto the paper. Also a gelatin was applied to a baryta-coated paper in a thickness of about 10 microns and the paper was immersed in an aqueous solution of alum followed by dry to provide a dye transfer paper. When the dye transfer paper was wetted with water, closely brought into contact with the emulsion layer having the color image, and after one minute the paper was separated, whereby a dense sharp blue image was obtained on the paper.

When the emulsion layer having the polymer image was immersed in a 0.1% aqueous solution of a red acid dye, Solar Rhodamine B extra, C.I. Acid Red 52 for 5 minutes and then washed with water, a red image was obtained.

The red image could be transferred onto a paper wetted by ethanol. Also, the color image could be transferred to the above-mentioned dye transfer paper wetted by water.

Also, when the emulsion layer having the polymer image was immersed in an aqueous solution of a yellow dye, Solar Pure Yellows 8 G, C.I. Acid Yellow 7 or Tartrazine C.I. Acid Yellow 23 and then washed with a buffer solution having a pH of 5.0, a yellow image was obtained, which could be transferred onto a paper wetted with methanol or onto the aforesaid dye transfer paper wetted by water.

EXAMPLE 6

The light-sensitive photographic film as in Example 2 was exposed for 1 second to light of 50 lux. through an optical wedge of 0.15 in step, and then processed in the processing solution having the following composition. In this example, the effect of a so-called ordinary developer was shown.

| Developer component | Sample number | | | |
|---|---|---|---|---|
| | 1 | 2 | 3 | 4 |
| Sodium methacrylate (g.) | 100 | 100 | 100 | 100 |
| β-Acetylphenylhydrazine (g.) | 0.75 | 0.75 | 0.75 | 0.75 |
| p-Methylaminophenol sulfate (mg.) | | 0.75 | 0.075 | |
| 1-phenyl-3-pyrazolidone (mg.) | | | | 0.075 |
| Potassium methabisulfite (g.) | 4 | 4 | 4 | 4 |
| 2 N aq. NaOH soln. (ml.) | 100 | 100 | 100 | 100 |

NOTE.—The pH of the system in all cases was 11.5.

After processing the sample in the above solution for 20 minutes at 30° C. the sample was subjected to post-processing as in Example 4. After sufficiently fixing and water washing, the sample was cut into two parts and one of them was subjected to complete bleaching using a Farmer's reducer. Further, about each sample, the optical densities of the portions corresponding to the optical densities of the 2nd step and the 7th step of the wedge and the fog were measured using a green filter, the results of which are shown in the following table.

TABLE IV

| Property | Sample number | | | |
|---|---|---|---|---|
| | 1 | 2 | 3 | 4 |
| Optical density at 2nd step | 0.44 | 1.62 | 1.75 | 1.29 |
| Optical density at 7th step | 0.07 | 1.35 | 1.37 | 1.11 |
| Optical density of unexposed portions | 0.04 | 0.46 | 0.07 | 0.29 |
| Dyeable final step number | 8 | 15 | 15 | 16 |

The optical density was the density of dye attached to the polymer selectively in proportion to the amount of irradiation and hence corresponded to the amount of the polymer formed. Also, the dyeable final step number was the step number at which the increase of dyeing density was observed when the sample dyed and bleached was compared with the fogged portions by naked eye. This value corresponded to the minimum exposure amount required to form the polymer selectively and as the dyeable final step number becomes higher, the higher is the sensititity obtained.

As the optical wedge had a step difference of 0.15, the fact that sample 2 could be observed in 7 steps more than sample 1 showed than in sample 2, the polymerization occurred to the same extent as sample 1 by the exposure amount of about $\frac{1}{10}$ of that required for sample 1. In other words, in the case of processing using processing solution 2, the same effect was obtained as the sample exposed 10 times longer and processed in processing solution 1. Also, on comparing sample 1 and sample 4, the density increase by dyeing was larger and the amount of polymer formed by the polymerization for the same exposure amount was larger.

Thus, by using a so-called developing agent together with the reducing agent of the present invention, the polymerization was accelerated effectively.

What we claim is:

1. A process for forming a dyed polymer image, which comprises reacting at least one of a hydrazine derivative selected from the group consisting of compounds of the formula:

(I) 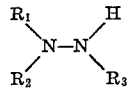

wherein $R_1$ represents a member selected from the group consisting of a hydrogen atom, a sulfone group, a water-soluble metal or ammonium salt of a sulfone group, an alkyl group, an aryl group, an acyl group, an arylhydrazino-carbonyl group, a thiocarbamoyl group, an arylazothiocarbonyl group, and an arylsulfonyl group; $R_2$ represents a member selected from the group consisting of a hydrogen atom, an alkyl group, and an aryl group, wherein said $R_1$ and $R_2$ are capable of forming a heterocyclic ring containing atoms selected from the group consisting of oxygen and nitrogen atoms; and $R_3$ represents a member selected from the group consisting of a hydrogen atom, a sulfone group, a water-soluble metal or ammonium salt of a sulfone group, an aryl group, and an acyl group; and wherein said $R_1$ and $R_3$ may together form a ring; and compounds of the formula:

(II) 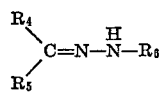

wherein $R_4$ represents a member selected from the group consisting of a hydrogen atom, an alkyl group, and an aryl group; $R_5$ represents a member selected from the group consisting of an alkyl group, a furyl group, a chlorine atom, and an aryl group, wherein said $R_4$ and $R_5$ may together form a ring containing carbon atoms, nitrogen atoms, and sulfur atoms; and $R_6$ represents a member selected from the group consisting of a hydrogen atom, a carbamoyl group, an oxalyl group, and an aryl group; and wherein said $R_6$ and $R_4$ may together form a ring, with a silver halide photographic emulsion layer having a latent image in the presence of at least one addition-polymerizable vinylidene monomer and a vinyl monomer to polymerize said monomer at the latent image-bearing portions of said emulsion layer, and subsequently dyeing the polymer image thus obtained with a dye having a charge opposite to that of the polymer of said polymer image when the dye is electrolytically dissociated.

2. The process of claim 1 wherein said polymerization is conducted in the presence of a sulfite ion.

3. The process of claim 2, wherein the precursor for said sulfite ions is a member selected from the group consisting of an alkali metal sulfite, an ammonium sulfite, an alkali metal bisulfite, an ammonium bisulfite, and a compound which provides sulfite ions upon hydrolysis, said compound being a member selected from the group consisting of an alkali metal pyrosulfite, an ammonium pyrosulfite, and the adduct of the reaction between a bisulfite and an aldehyde.

4. The process of claim 2, wherein said sulfite ions are present in an amount of 0.05 mole per liter.

5. The process of claim 2, wherein said sulfite ions are present in an amount of 0.2 mole per liter.

6. The process of claim 2, wherein said sulfite ions do not exceed an amount of 15 moles per liter.

7. The process as claimed in claim 1 wherein said polymerization is conducted further in the presence of a small amount of an ordinary photographic developing agent.

8. The process as claimed in claim 7 wherein said ordinary developing agent is selected from the group consisting of a 1-aryl-3-oxopyrazolidine, a 1-aryl-3-iminopyrazolidine, and a compound having in the molecule the structure

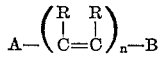

wherein A and B each represents —OH, —NH₂, or —NHR, R represents an alkyl group or an aryl group, and $n$ is an integer.

9. The process of claim 1 wherein said polymerization is conducted after said silver halide photographic emulsion layer is processed in a solution of an ordinary developing agent.

10. The process of claim 9 wherein said ordinary developing agent is selected from the group consisting of a 1-aryl-3-oxopyrazolidine, a 1-aryl-3-iminopyrazolidine, and a compound of the formula:

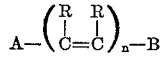

wherein A and B each represents —OH, —NH₂, or —NHR, R represents an alkyl group or an aryl group, and $n$ is an integer.

11. The process of claim 10, wherein said developing agent is present in an amount of from 1/10 to 20 moles per mole of silver halide employed.

12. The process of claim 1, wherein said hydrazine derivative is a member selected from the group consisting of hydrazine sulfate, hydrazine-D-tartrate, methylhydrazine, 2-hydroxyethylhydrazine, benzylhydrazine, N,N-dimethylhydrazine, N-aminohomopiperidine, N-aminomorpholine, N-benzyl-N-phenylhydrazine, N-methyl-N-phenylhydrazine, o-nitrophenylhydrazine, p-methylphenylhydrazine, ammonium hydrazinedisulfonate, azobenzenephenylhydrazine-β-sulfonic acid, benzoylhydrazine, α-pic- olinic acid hydrazide, isonicotinic acid hydrazide, 2-hydroxy-3-naphtoic acid hydrazide, Girard T, oxalyhydrazine, adipic acid hydrazide, phenylglycine hydrazide, lumino, carbohydrazide, β-acetylphenylhydrazine, diphenylcarbazide, di-β-naphthylthiocarbazone, thiosemicarbazide hydrochloride, dithizone, nitrofurazone, cyclopentanone semicarbazone, benzenesulfonyl hydrazide, p-toluenesulfonyl hydrazide, ethyl-α-butylacetoacetate semicarbazone, acetophenone hydrazone, p-aminoacetophenone hydrazone, o-tolylhydrazine, m-tolylhydrazine, p-nitrophenylhydrazine, phenylhydrazine nitrate, 3-chloroindazole, 2-pyrazoline, 3-methylbenzothiazolone hydrazone, m-hydroxybenzaldehyde semicarbazone, phenylhydrazine-p-toluene sulfonate, 4-amino-1,2,4-triazole, acetone phenylhydrazine, levulinic acid methylesterphenylhydrazone, cupferazone, 4-phenylsemicarbazide, 1-phenyl-5-pyrazolone-3-carboxylic acid hydrazide, phthalic acid monophenylhydrazide, β-phenoxyacetic acid phenylhydrazide, succinic acid monophenylhydrazide, β-acetyl-p-tolylhydrazide, and 1-phenyl-4-methyl-3-pyrazolidone.

13. The process of claim 1, wherein said vinyl compound is a member selected from the group consisting of acrylamide, acrylonitrile, N-hydroxymethylacrylamide, methacrylamide, N-t-butylacrylamide, methacrylic acid, acrylic acid, calcium acrylate, sodium acrylate, methylmethacrylate, methylacrylate, ethylacrylate, vinylpyrrolidone, 2-vinylpyridine, 4-vinylpyridine, 2-methyl-N-vinylimidazole, potassium vinylbenzenesulfonate, and vinylcarbazole.

14. The process of claim 1, wherein said vinyl compound has two or more vinyl groups, and is a member selected from the group consisting of N,N'-methylenebisacrylamide, ethyleneglycol dimethacrylate, triethylene glycol dimethacrylate, diethylene glycol dimethacrylate, polyethylene glycol dimethacrylate, divinyl ether, divinyl benzene, bisphenol-A-dimethacrylate, and trimethylolpropane trimethacrylate.

15. The process of claim 1, wherein said process is carried out at a pH greater than about 8.

16. The process of claim 1, wherein said process is carried out at a pH of greater than 9.

17. The process of claim 1, further comprisig a thermal polymerization inhibitory amount of a thermal polymerization inhibitor.

18. The process of claim 17, wherein said inhibitor is present in an amount of from 10 parts per million to 2/100 parts per million of the weight of the vinyl monomer employed.

19. The process of claim 17, wherein said inhibitor is a member selected from the group consisting of p-methoxyphenol, hydroquinone, alkylhydroquinone, and 2,6-di-t-butyl-p-cresol.

20. The process of claim 1, wherein said vinyl compound is employed in an amount of from 1/30 to 30 times the weight of high molecular weight compound in the emulsion.

21. The process of claim 20, wherein said vinyl compound is employed in an amount of from 1/4 to 4 times the weight of the high molecular weight compound in the emulsion.

22. The process of claim 1, wherein the amount of said silver halide present ranges from 1/20 to 2 times by weight that of the high molecular weight compound in the emulsion.

23. The process of claim 22, wherein said amount ranges from 1/10 to 1/2 times by weight the high molecular weight compound in the emulsion.

24. The process of claim 1, wherein said hydrazine derivative is present in an amount of from 1/1000 mole to 5 moles per liter of solution.

25. The process of claim 24, wherein said amount ranges from 1/50 to 1 mole per liter of solution.

26. The process of claim 1, wherein said polymer is a polymer having a negative charge and selected from the group consisting of vinyl compounds having a carboxyl group, vinyl compounds having a metal salt or an ammonium salt of a carboxyl group, vinyl compounds having a sulfonic acid group, and vinyl compounds having a metal salt or an ammonium salt of sulfonic acid.

27. The process of claim 1, wherein said polymer is a polymer having a positive charge and is a member selected from the group consisting of vinyl compounds having a basic nitrogen atom and vinyl compounds having quaternary salt nitrogen atoms.

28. The process of claim 1, wherein said dye is an acid dye and a member selected from the group consisting of Acid Yellow 7, Acid Yellow 23, Acid Red 1, Acid Red 52, Acid Blue 9, Acid Blue 45, and Acid Blue 62.

29. The process of claim 1, wherein said dye is a basic dye and a member selected from the group consisting of Basic Yellow 1, Basic Yellow 2, Basic Red 1, Basic Red 2, Basic Blue 25, Basic Violet, and Basic Violet 10.

References Cited

UNITED STATES PATENTS

| | | | |
|---|---|---|---|
| 3,019,104 | 1/1962 | Oster | 96—29 |
| 3,038,800 | 6/1962 | Luckey et al. | 96—35.1 |
| 2,887,376 | 5/1959 | Tupis | 96—35.1 |
| 3,585,030 | 6/1971 | Pelz et al. | 96—29 |

OTHER REFERENCES

Mees, C. E. K., "The Theory of the Photographic Process," 1942, pp. 338–339.

RONALD H. SMITH, Primary Examier

U.S. Cl. X.R.

96—35.1, 115 P